(12) United States Patent
Gaffney

(10) Patent No.: US 7,909,126 B2
(45) Date of Patent: Mar. 22, 2011

(54) SYSTEM AND METHOD FOR INTEGRATING A TORQUE VECTORING DIFFERENTIAL WITH A STABILITY CONTROL SYSTEM

(75) Inventor: Edmund F. Gaffney, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 241 days.

(21) Appl. No.: 12/115,370

(22) Filed: May 5, 2008

(65) Prior Publication Data
US 2009/0272592 A1 Nov. 5, 2009

(51) Int. Cl.
*B60K 28/16* (2006.01)
(52) U.S. Cl. ......... 180/197; 180/6.2; 180/233; 180/244; 180/245; 303/140
(58) Field of Classification Search ............... 180/197, 180/233, 244, 245, 246, 248, 6.2; 303/140–142
See application file for complete search history.

(56) References Cited

U.S. PATENT DOCUMENTS

| | | | | |
|---|---|---|---|---|
| 6,324,458 | B1 * | 11/2001 | Takagi et al. | 701/70 |
| 7,334,670 | B2 * | 2/2008 | Namuduri et al. | 192/21.5 |
| 7,491,147 | B2 * | 2/2009 | Ross | 475/225 |
| 7,516,006 | B2 * | 4/2009 | Mori | 701/69 |
| 7,548,806 | B2 * | 6/2009 | Yasutake et al. | 701/38 |
| 2005/0176543 | A1 * | 8/2005 | Kirkwood et al. | 475/5 |
| 2005/0258685 | A1 * | 11/2005 | Post et al. | 303/139 |
| 2006/0052198 | A1 * | 3/2006 | Namuduri et al. | 475/5 |
| 2007/0193802 | A1 * | 8/2007 | Hu | 180/197 |
| 2007/0289797 | A1 * | 12/2007 | Bowen | 180/245 |
| 2009/0181819 | A1 * | 7/2009 | Sharma et al. | 475/224 |
| 2009/0242289 | A1 * | 10/2009 | Murty | 180/65.265 |

OTHER PUBLICATIONS

Sawase, K., et al. "Left-Right Torque Vectoring Technology as the Core of Super All Wheel Control (S-AWC)," Mitsubishi Motors Technical Review. [Retrieved on Oct. 26, 2010]. Retrieved from Internet: <URL: http://www.mitsubishi-motors.com/corporate/about_us/technology/review/e/pdf/2006/18e_03.pdf>.

* cited by examiner

*Primary Examiner* — Lesley Morris
*Assistant Examiner* — Tashiana Adams
(74) *Attorney, Agent, or Firm* — Ingrassia Fisher & Lorenz, P.C.

(57) ABSTRACT

Methods and apparatus are provided for integrating a torque vectoring differential (TVD) and a stability control system in a motor vehicle. The integrated system is utilized for more efficiently correcting understeer and/or oversteer slides in a motor vehicle. In correcting these slides, the integrated system utilizes the TVD to rotate two wheels on opposite sides of the motor vehicle at different rates to create a yaw moment at the vehicle's center of gravity until the TVD reaches a saturation point and the understeer or oversteer slide is not corrected. Once the saturation point is reached without correcting the understeer or oversteer slide, the stability control system is employed to selectively apply one or more of the vehicle's brakes in a further effort to correct the understeer or oversteer slide.

18 Claims, 4 Drawing Sheets

SYSTEM AND METHOD FOR INTEGRATING A TORQUE VECTORING DIFFERENTIAL WITH A STABILITY CONTROL SYSTEM

FIELD OF THE INVENTION

The present invention generally relates to motor vehicles, and more particularly relates to integrating a torque vectoring differential and an electronic stability control system in a motor vehicle.

BACKGROUND OF THE INVENTION

Systems and methods for aiding a driver to regain control of a motor vehicle when it becomes unstable has been a focus of research for some time. The most common types of unstable conditions are generally referred to as "understeer" or "oversteer" slides. An understeer slide is the situation where the front end of the vehicle moves toward the outside of a turn instead of following the curvature of the turn. An oversteer slide is the situation where the rear of the motor vehicle moves toward the outside of the turn (i.e., fish-tailing)

One system known to correct or minimize an understeer or oversteer slide is a torque vectoring differential (TVD). Typically, a TVD is an electronically-controlled differential that can create an understeering or oversteering moment about the center of gravity of a motor vehicle independent of the speeds of the wheels. In other words, a TVD is able to distribute engine power to a wheel regardless of whether that particular wheel is rotating at a faster or slower rate than the other wheel sharing the differential. In this manner, a TVD is different from a Limited Slip Differential (LSD), which generates understeer or oversteer moments as a function of distributing the wheel speed from the faster rotating wheel to the slower rotating wheel across the differential. Accordingly, a TVD utilizes the concepts of understeer and oversteer gradients to affect the dynamics of the vehicle. Thus, the ability of a TVD to create an understeering or oversteering moment about the center of gravity of the vehicle independent of the speeds of the wheels, up to a fixed limit of wheel speed difference (i.e., a saturation point), greatly increases the range of authority that a TVD has on vehicle dynamics, as compared with an LSD.

A TVD typically includes one or more sensors in communication with one or more controllers (e.g., microcontrollers). The sensors are located at a variety of places on the vehicle and continually monitor the vehicle for any signs of instability. Once instability is detected, the sensors notify the controller(s), and once notified, the controller(s) provide differing amounts of power to the wheels such that the wheels are able to rotate at different rates. By rotating the wheels at different rates, a TVD is able to correct or minimize the effects of an understeer or oversteer situation by creating an understeer or oversteer moment at the center of gravity.

Another system to help the driver regain control of the vehicle when the vehicle begins to experience instability is a stability control system (SCS). Typically, an SCS include one or more controllers (e.g., microcontrollers) coupled to one or more sensors located at various places on the vehicle that are able to detect understeer and oversteer slides. Once an understeer and oversteer slide is detected, the sensors notify the controller(s), which "automatically" applies braking to one or more wheels to thereby stabilize the vehicle. In other words, an SCS is designed to deliver transparent intervention the moment a situation becomes unstable by applying the brakes at one or more selected wheels depending on whether the unstable condition is a left-turn or right-turn understeer slide, or a left-turn or right-turn oversteer slide.

An SCS is more effective for correcting or minimizing an understeer or oversteer slide than a TVD; however, because an SCS utilizes the vehicle's brakes to correct or minimize an understeer/oversteer slide, a significant amount of the vehicle's energy is converted into mechanical "heat" (i.e., kinetic energy is lost). By contrast, although utilizing a TVD to correct or minimize the effects of an understeer/oversteer slide is less effective than an SCS, a TVD is more efficient from an energy loss point of view. Moreover, although a TVD is not as effective as an SCS, a TVD is sufficient to correct or minimize the effects of most understeer and oversteer slides. Accordingly, it is desirable to provide a system and method for integrating a TVD with an SCS to provide a more efficient system of regaining control of a vehicle experiencing an unstable condition. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An integrated system is provided for more efficiently correcting unstable conditions (e.g., understeer slides and oversteer slides) in a motor vehicle. The integrated system, in one embodiment, includes a first system (e.g., a TVD) coupled to a first wheel having a first brake and a second wheel having a second brake, wherein the first system is configured to rotate the first wheel and the second wheel at different rates to correct or minimize the effects of the unstable condition. Furthermore, the integrated system includes a second system (e.g., an SCS) coupled to a third brake associated with a third wheel and coupled to a fourth brake associated with a fourth wheel, the second system being configured to selectively apply at least one of the first brake and the second brake to correct or minimize the effects of the unstable condition. Moreover, the integrated system includes a controller coupled to the first system and the second system, and at least one sensor coupled to the controller, wherein the sensor is configured to detect the unstable condition and notify the controller of the unstable condition, and the controller is configured to instruct the first system to rotate the first wheel and the second wheel at different rates and/or the second system to selectively apply at least one of the first brake and the second brake in response to the notification.

A method is provided for more efficiently correcting unstable conditions in a motor vehicle. The method, in one embodiment, comprises detecting one of a right-turn oversteer, a left-turn oversteer, a right-turn understeer, and a left-turn understeer. Once detected, the method includes utilizing a first system (e.g., a TVD) to correct the right-turn oversteer, the left-turn oversteer, the right-turn understeer, or the left-turn understeer until the first system reaches a saturation point. When the saturation point is reached, the method utilizes a second system (e.g., an SCS) to correct the right-turn oversteer, the left-turn oversteer, the right-turn understeer, or the left-turn understeer, whatever the case may be.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
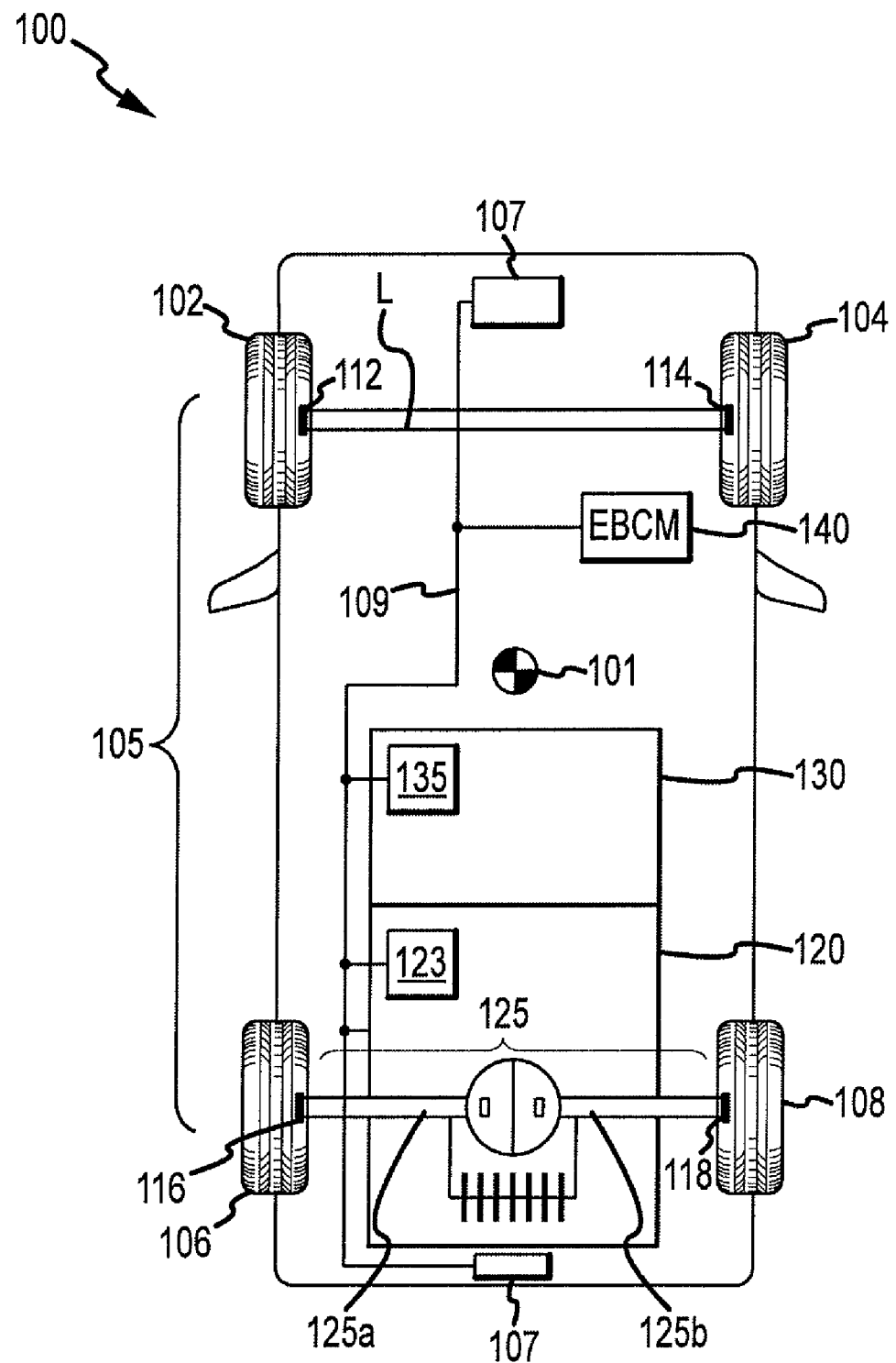
FIG. 1 is a diagram illustrating one embodiment of a motor vehicle including a system comprising an integrated torque vectoring differential and stability control system.

FIG. 1 is a diagram illustrating a bottom view of a motor vehicle 100 including one embodiment of a system 105 to correct oversteer and understeer slides. As illustrated, motor vehicle 100 includes four wheels (e.g., wheel 102, wheel 104, wheel 106, and wheel 108), wherein there are two "front" wheels (e.g., wheels 102 and 104) separated by a distance defining a track width L (i.e., wheelbase width), two "rear" wheels (e.g., wheels 106 and 108), two "driver-side" wheels (e.g., wheels 104 and 108), and two "passenger-side" wheels (e.g., wheels 102 and 106) for a left-sided driver (the opposite is true for a right-sided driver). Furthermore, each of wheels 102, 104, 106, and 108 includes at least one brake (e.g., brake 112, brake 114, brake 116, and brake 118) associated with it such that, when applied, brakes 112, 114, 116, and 118 are able to slow down and/or stop the rotational speed of wheels 102, 104, 106, and 108, respectively.

In accordance with one embodiment, system 105 includes a plurality of sensors 107 to detect understeer and oversteer slides, a torque vectoring differential (TVD) 120 to create a yaw moment about the center of gravity 101, a TVD controller 123 coupled to TVD 120, a stability control system (SCS) 130, and an electronic braking control module (eBCM) 140 coupled to TVD 120 and SCS 130, wherein each of these components is in communication with one another via a bus 109 (e.g., a large area network (LAN) bus). TVD 120, in one embodiment, includes an axle 125 comprising a portion 125a and a portion 125b. Portions 125a and 125b, in one embodiment, are not constrained together; thus, portions 125a and 125b are capable of being separately driven by the engine (not shown) of motor vehicle 100, which enables wheels 106 and 108 to rotate at different rates. For example, portion 125a is able to be driven at a faster rate than portion 125b, which allows wheel 106 to rotate at a faster rate than wheel 108. Similarly, portion 125b is able to be driven at a faster rate than portion 125a, which allows wheel 108 to rotate at a faster rate than wheel 106.

As discussed above, TVD 120 is configured to rotate wheels 106 and 108 at speeds independent of one another. In other words, TVD 120 is capable of transferring wheel speed "to" wheel 106 "from" wheel 108 (via portions 125a and 125b) regardless of whether wheel 106 is rotating faster or slower than wheel 108. Likewise, TVD 120 is capable of transferring wheel speed to wheel 108 from wheel 106 (via portions 125a and 125b) regardless of whether wheel 108 is rotating faster or slower than wheel 106.

As illustrated in FIG. 1, TVD 120 is coupled to TVD controller 123. Moreover, TVD controller 123 is coupled to sensors 107 and configured to receive notification from sensors 107 that motor vehicle 100 is experiencing an unstable condition. In accordance with one embodiment, TVD controller 123 is a controller (i.e., a microcontroller) configured to receive and/or store a desired yaw rate and a measured yaw rate for motor vehicle 100. In another embodiment, TVD controller 123 is configured to receive and/or store a yaw rate error and a desired yaw acceleration rate (i.e., yaw rate commands) for motor vehicle 100. Moreover, TVD controller 123 is configured to output to TVD 120 a representation of a delta torque value based on the desired yaw rate and the measured yaw rate, or the yaw rate error and the desired yaw acceleration rate, wherein the delta torque value is a representation of the difference in torque between wheel 106 (i.e., right-rear (RR) wheel torque 116') and wheel 108 (i.e., left-rear (LR) wheel torque 118') or (RR wheel torque 116'–LR wheel torque 118').

In operation, TVD 120 generates a yaw moment based on the delta torque value received from TVD controller 123 and various other known characteristics of motor vehicle 100. In one embodiment, the yaw moment generated by TVD 120 can be expressed by the following equation:

$$\text{Yaw Moment} = (\text{RR wheel torque } 116' - \text{LR Wheel Torque } 118') \cdot (L/(2(\text{Tire Radius}))),$$

where L and the tire radius of motor vehicle 100 are the known characteristics.

Moreover, TVD controller 123 is configured to monitor the speeds of wheels 106 and 108 to determine if TVD 120 has reached a saturation point, and upon reaching the saturation point, notifying eBCM 140 that TVD 120 has reached such saturation point. In one embodiment, the saturation point is the point at which TVD 120 can no longer create a difference in torque between wheels 106 and 108. In other words, the point at which TVD 120 can no longer affect the speeds at which wheels 106 and 108 rotate. In another embodiment, the saturation point is a temperature below which TVD 120 is unable to generate enough power to affect the speeds at which wheels 106 and 108 rotate. In yet another embodiment, the saturation point is a voltage below which TVD 120 is unable to generate enough power to affect the speeds at which wheels 106 and 108 rotate.

In addition, system 105 includes SCS 130, which includes one or more stability control (SC) controllers 135 (e.g., microcontrollers), coupled to TVD 120 and to each of brakes 112, 114, 116, and 118 via bus 109. SC controller 135 is configured to selectively apply one or more of brakes 112, 114, 116, and 118 as needed to correct or minimize understeer or oversteer slide, depending upon whether motor vehicle 100 is experiencing a left-turn understeer, a right-turn understeer, a left-turn oversteer, or a right-turn oversteer. Notably, SCS 130 generally includes an anti-lock brake system (ABS), a traction control system, an electronic brake differential, and an engine drag control to selectively apply one or more of brakes 112, 114, 116, and 118, as is known in the art, although these are not illustrated in FIG. 1.

In accordance with one embodiment, system 105 includes eBCM 140 in communication with TVD 120 and SCS 130 via bus 109. eBCM 140, in one embodiment, is a module configured to supervise TVD 120 and integrate TVD 120 with SCS 130 (and the ABS). In addition, eBCM 140 is configured to receive the yaw moment data generated by TVD 120 and a notice from TVD 120 that TVD 120 is operating at a saturation point. Furthermore, eBCM 140 is configured to instruct SCS 130 to begin operating (i.e., begin selectively applying one or more of brakes 112, 114, 116, and 118, as needed) and/or instruct TVD 120 to cease operating.

In accordance with one embodiment, eBCM 140 is configured to instruct TVD 120 to cease operating prior to instructing SCS 130 to commence operating. In another embodiment, SCS 130 is only active on the front wheels and brakes (i.e., wheel 102 and brake 112, and wheel 104 and brake 114) such that eBCM 140 instructs SCS 130 to begin applying brake 112 or brake 114 (depending upon which is needed) in addition to TVD 120 rotating wheels 106 and 108 at different speeds.

Figure 2:
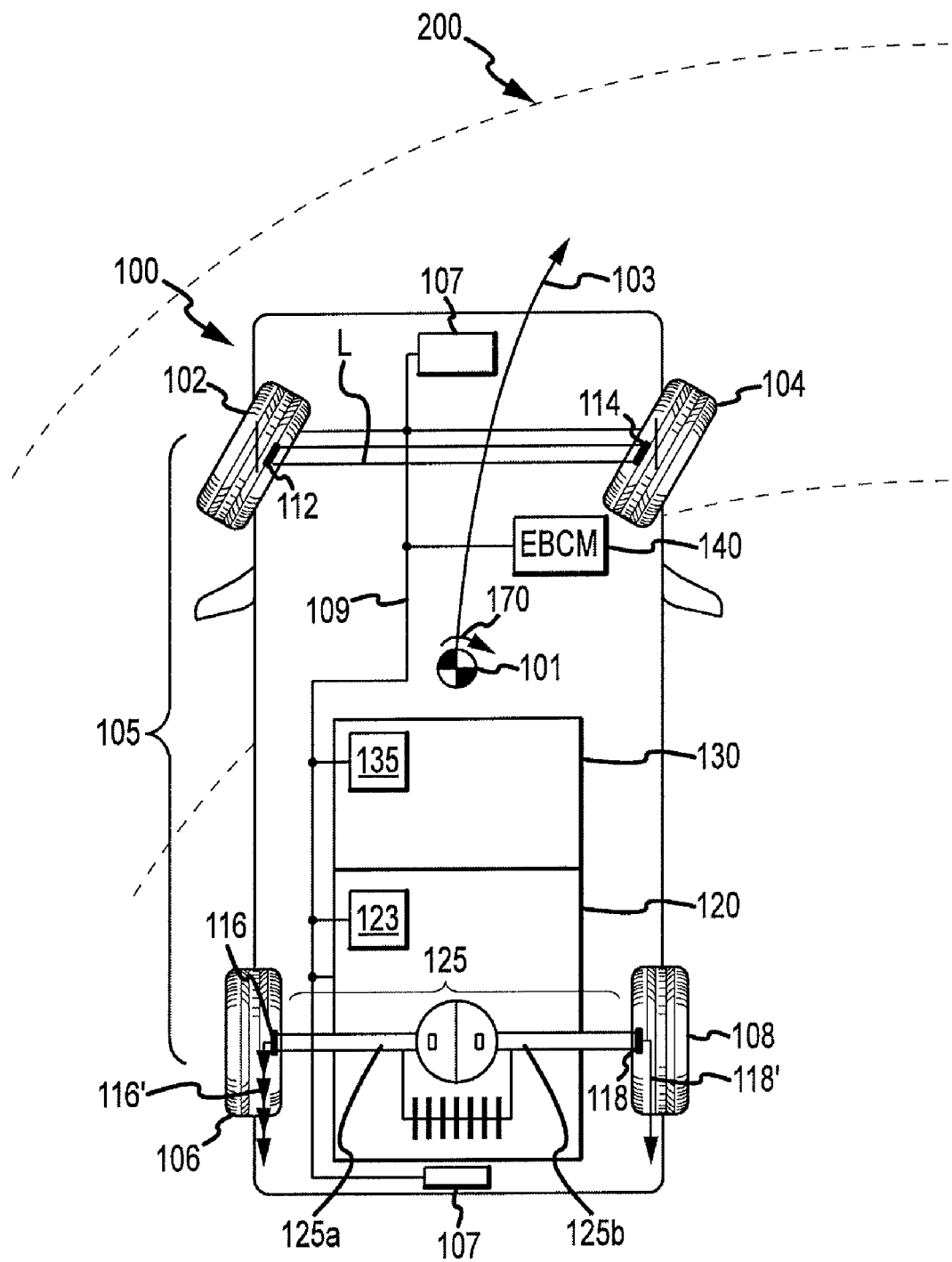
FIG. 2 is a diagram illustrating one example of the system in FIG. 1 operating to correct or minimize an understeer slide.

FIG. 2 is a diagram illustrating one example of the operation of system 105 when motor vehicle 100 is experiencing a left-turn understeer slide. As illustrated, motor vehicle 100 should be turning along curve 200; however, the actual path 103 of motor vehicle 100 "over-shoots" curve 200. In this situation, sensor(s) 107 detects the understeer slide and notifies eBCM 140 and/or TVD controller 123 of the left-turn understeer slide. Upon receiving the notification from sensor 107 and/or eBCM 140, TVD 120 begins rotating wheel 106 at a faster rate than wheel 108 to create a yaw moment 170 about center of gravity 101. This is created by RR wheel torque 116' being greater than LR wheel torque 118', and shown by RR wheel torque 116' being annotated with more arrows than LR wheel torque 118'.

If, however, the saturation point of TVD 120 is reached and motor vehicle 100 is not sufficiently corrected, TVD 120 notifies eBCM 140 that TVD 120 is operating at saturation. At this point, eBCM 140 instructs SCS 130 to begin selective braking. Since this is a left-turn understeer slide, SCS 130 will begin applying brake 118 (as needed) to wheel 108.

In one embodiment, prior to instructing SCS 130 to begin selective braking, eBCM 140 will instruct TVD 120 to cease rotating wheels 106 and 108 at different rates since it is desirable that TVD 120 and SCS 130 not be functioning on the same wheel at the same time. Notably, the opposite of the description with reference to FIG. 2 occurs when motor vehicle 100 is experiencing a right-turn understeer slide (i.e., wheel 108 rotates faster prior to saturation, and brake 116 is applied after saturation).

Figure 3:
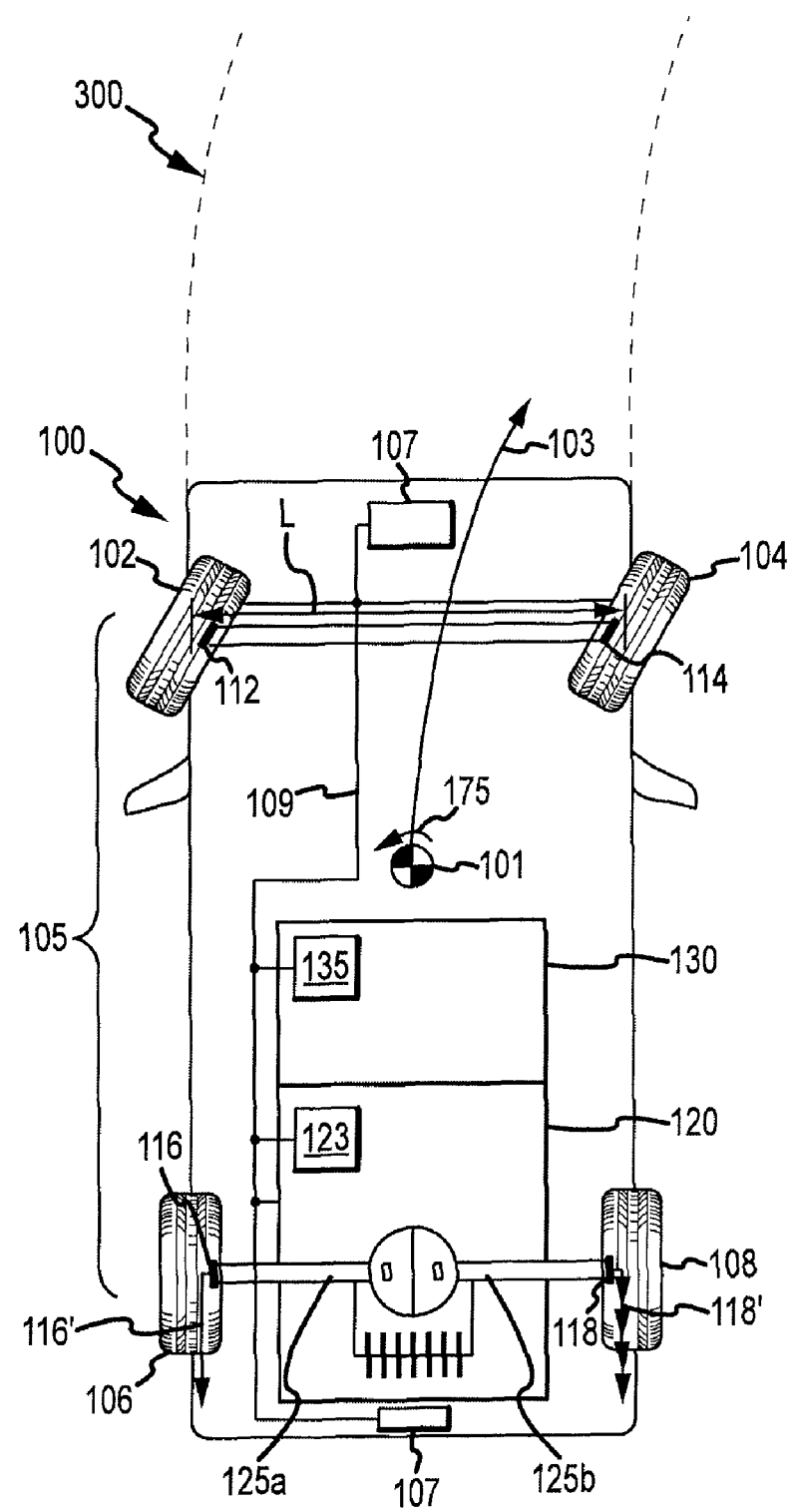
FIG. 3 is a diagram illustrating another example of the system in FIG. 1 operating to correct or minimize an oversteer slide.

FIG. 3 is a diagram illustrating one example of the operation of system 105 when motor vehicle 100 is experiencing a left-turn oversteer slide. As illustrated, motor vehicle 100 should be turning along curve 300; however, the actual path 103 of motor vehicle 100 "under-shoots" curve 300. In this situation, sensor(s) 107 detects the oversteer slide and notifies eBCM 140 and/or TVD controller 123 of the left-turn oversteer slide. Upon receiving the notification, TVD 120 begins rotating wheel 108 at a faster rate than wheel 106 to create a yaw moment 175 about center of gravity 101. This is created by LR wheel torque 118' being greater than RR wheel torque 116', and shown by LR wheel torque 118' being annotated with more arrows than RR wheel torque 116'.

If, however, the saturation point of TVD 120 is reached and motor vehicle 100 is not sufficiently corrected, TVD 120 notifies eBCM 140 that TVD 120 is operating at saturation. At this point, eBCM 140 instructs SCS 130 to begin selective braking. Since this is a left-turn oversteer slide, SCS 130 will begin applying brake 112 (as needed) to wheel 102. In one embodiment, eBCM 140 may instruct TVD 120 to cease rotating wheels 106 and 108 at different rates prior to instructing SCS 130 to begin selective braking. In other embodiments, TVD 120 and SCS 130 may operate at substantially the same time to correct or minimize the left-turn oversteer slide. In other words, TVD is rotating wheel 108 at a faster rate than wheel 106 and SCS 130 is applying brake 112, as needed. Notably, the opposite of the description with reference to FIG. 3 occurs when motor vehicle 100 is experiencing a right-turn oversteer slide (i.e., TVD 120 rotates wheel 106 faster than wheel 108, and/or brake 114 is applied to wheel 104).

Figure 4:
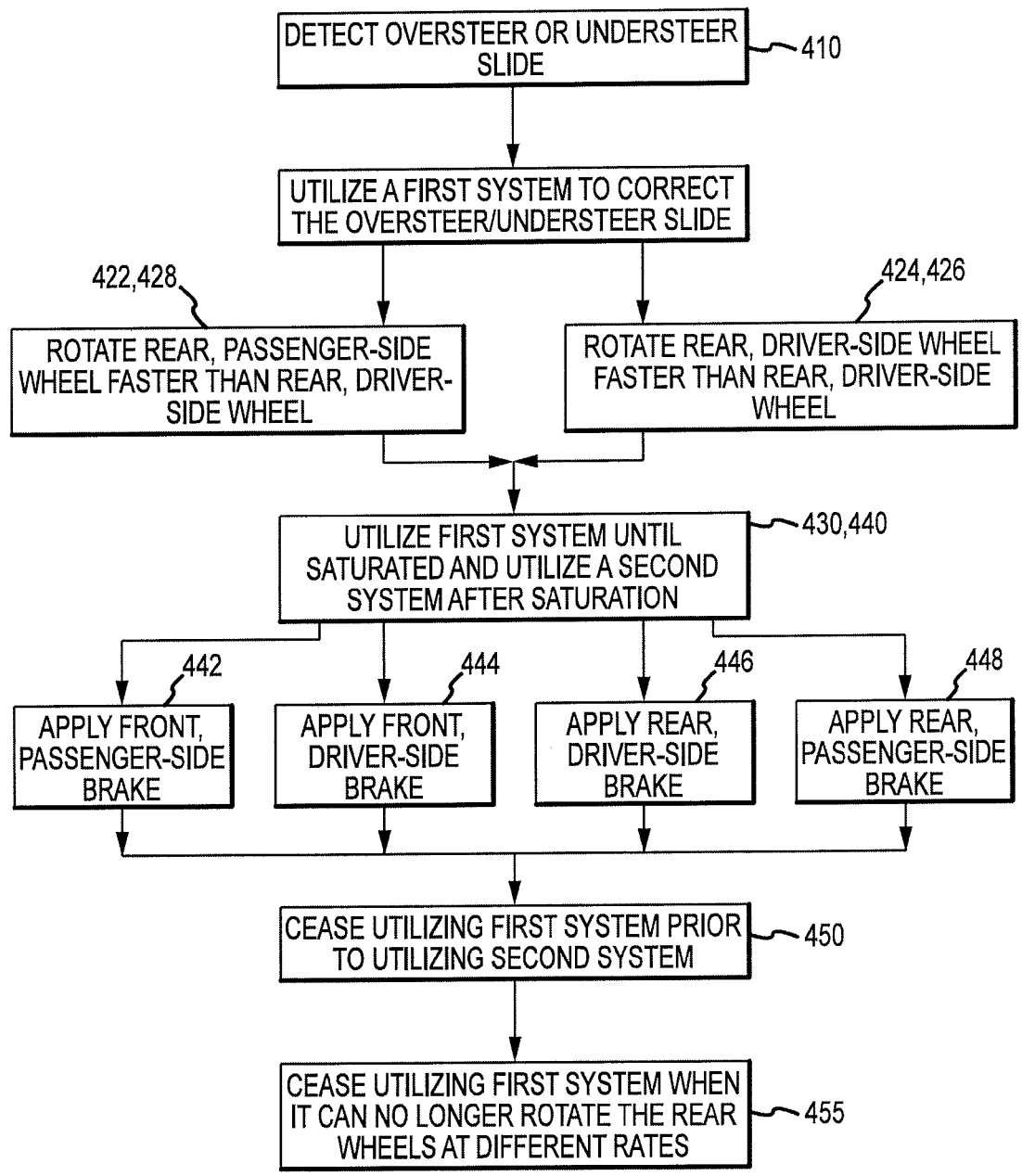
FIG. 4 is a flow diagram of a method of controlling a motor vehicle slide utilizing the integrated system of FIG. 1.

FIG. 4 is a flow diagram illustrating a representation of one embodiment of a method 400 of correcting a motor vehicle slide (e.g., oversteer slides and an understeer slides). Method 400, in one embodiment, includes detecting a right-turn oversteer slide, a left-turn oversteer slide, a right-turn understeer slide, or a left-turn understeer slide (step 410).

Once a slide is detected, method 400 includes utilizing a first system (e.g., TVD 120) to correct the detected right-turn oversteer slide, the left-turn oversteer slide, the right-turn understeer slide, or the left-turn understeer slide (step 420). In accordance with one embodiment, step 420 includes rotating a rear, passenger-side wheel at a higher rate than a rear, driver-side wheel to correct the left-turn understeer (step 422), rotating the rear, driver-side wheel at a higher rate than the rear, passenger-side wheel to correct the right-turn understeer (step 424), rotating the rear, driver-side wheel at a higher rate than the rear, passenger-side wheel to correct the left-turn oversteer (step 426), and rotating the rear, passenger-side wheel at a higher rate than the rear, driver-side wheel to correct the right-turn oversteer (step 428).

In accordance with one embodiment, method 400 includes utilizing the first system until the first system reaches a saturation point (step 430). Once the saturation point is reached, method 400 includes utilizing a second system (e.g., SCS 130) to correct the right-turn oversteer slide, the left-turn oversteer slide, the right-turn understeer slide, or the left-turn understeer slide (step 440). Step 440, in one embodiment, includes applying a front, passenger-side brake to correct the left-turn oversteer (step 442) and applying a front, driver-side brake to correct the right-turn oversteer (step 444). Moreover, step 440 includes applying a rear, driver-side brake to correct the left-turn understeer (step 446) and applying a rear, passenger-side brake to correct the right-turn understeer (step 448).

Method 400, in another embodiment, includes ceasing to utilize the first system prior to utilizing the second system when the saturation point is reached (step 450). In another embodiment, step 450 includes ceasing to utilize the first system when the first system can no longer rotate the rear, passenger-side wheel and the rear, driver-side wheel at different rates (step 455).

Notably, method 400 has been described with reference to a motor vehicle having a left-sided driver. However, one skilled in the art is capable of applying method 400 to a motor vehicle having a right-sided driver since the reference points (i.e., the driver-side and passenger-side) are opposite for a right-sided driver than the embodiment described with reference to FIG. 4.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A motor vehicle comprising:
   a first wheel including a first brake;
   a second wheel including a second brake;
   a third wheel including a third brake;
   a fourth wheel including a fourth brake;
   at least one sensor coupled to the controller, wherein the at least one sensor is configured to detect an unstable condition and provide a first notification to the controller of the unstable condition;
   a first system coupled to the first wheel and the second wheel, the first system configured to rotate the first wheel and the second wheel at different rates and to provide a second notification when the first system is no longer able to rotate the first wheel and the second wheel at different rates;
   a second system coupled to the third brake and the fourth brake, the second system configured to selectively apply at least one of the first brake and the second brake; and
   a controller coupled to the first system, the second system, and the at least one sensor, the controller configured to receive the first notification and second notification, and operable thereto, to:
      instruct the first system to rotate the first wheel and the second wheel at different rates in response to the first notification; and
      instruct the second system to selectively apply at least one of the first brake and the second brake in response to the second notification.

2. The motor vehicle of claim 1, wherein the controller is further configured to instruct the first system to rotate the first wheel and the second wheel at different rates prior to instructing the second system to selectively apply at least one of the first brake and the second brake.

3. The motor vehicle of claim 1, wherein the controller is further configured to instruct the first system to cease rotating the first wheel and the second wheel at different rates prior to instructing the second system to selectively apply at least one of the first brake and the second brake.

4. The motor vehicle of claim 1, wherein the first wheel and the second wheel are rear wheels and the third wheel and the fourth wheel are front wheels.

5. The motor vehicle of claim 1, wherein the first system is a torque vectoring differential (TVD) system.

6. The motor vehicle of claim 5, wherein the second system is a stability control system (SCS).

7. The motor vehicle of claim 5, wherein the first wheel and the second wheel are rear wheels, the third wheel and the fourth wheel are front wheels, the first wheel and the third wheel are on a driver side, and the second wheel and the fourth wheel are on a passenger side, and the TVD is configured to rotate the second wheel at a higher rate than the first wheel when a left-turn understeer is detected and rotate the first wheel at a higher rate than the second wheel when a right-turn understeer is detected.

8. The motor vehicle of claim 7, wherein the TVD is configured to rotate the first wheel at a higher rate than the second wheel when a left-turn oversteer is detected and rotate the second wheel at a higher rate than the first wheel when a right-turn oversteer is detected.

9. The motor vehicle of claim 5, wherein the TVD is configured to notify the controller when the TVD is no longer able to rotate the first wheel and the second wheel at different rates and the unstable condition is not corrected, and the controller is configured to instruct the TVD to cease operating.

10. The motor vehicle of claim 9, wherein the controller is configured to instruct the stability control system to apply the fourth brake when a left-turn oversteer occurs, apply the third brake when a right-turn oversteer occurs, apply the first brake when a left-turn understeer occurs, and apply the second brake when a right-turn understeer occurs.

11. A method of correcting a motor vehicle slide comprising the steps of:
    detecting one of a right-turn oversteer, a left-turn oversteer, a right-turn understeer, and a left-turn understeer;
    utilizing a first system to correct the one of the right-turn oversteer, the left-turn oversteer, the right-turn understeer, and the left-turn understeer provided that the first system is able to correct the one of the right-turn oversteer, the left-turn oversteer, the right-turn understeer, and the left-turn understeer; and
    utilizing a second system to correct the one of the right-turn oversteer, the left-turn oversteer, the right-turn understeer, and the left-turn understeer if a notification has been received indicating that the first system is unable to correct the one of the right-turn oversteer, the left-turn oversteer, the right-turn understeer, and the left-turn understeer.

12. The method of claim 11, further comprising the step of:
    ceasing to utilize the first system prior to utilizing the second system when the first system reaches a saturation point.

13. The method of claim 12, wherein ceasing comprises the step of:
    ceasing to utilize the first system when the first system is no longer able to rotate the rear, passenger-side wheel and the rear, driver-side wheel at different rates.

14. The method of claim 11, wherein utilizing the first system comprises the steps of:
    rotating a rear, passenger-side wheel at a higher rate than a rear, driver-side wheel to correct the left-turn understeer; and
    rotating the rear, driver-side wheel at a higher rate than the rear, passenger-side wheel to correct the right-turn understeer.

15. The method of claim 11, wherein utilizing the first system further comprises the steps of:
    rotating the rear, driver-side wheel at a higher rate than the rear, passenger-side wheel to correct the left-turn oversteer; and
    rotating the rear, passenger-side wheel at a higher rate than the rear, driver-side wheel to correct the right-turn oversteer.

16. The method of claim 11, wherein utilizing the second system comprises the steps of:
    applying a front, passenger-side brake to correct the left-turn oversteer; and
    applying a front, driver-side brake to correct the right-turn oversteer.

17. The method of claim 16, wherein utilizing the second system further comprises the step of:
    applying a rear, driver-side brake to correct the left-turn understeer.

18. A method for correcting a slide of a motor vehicle having a first wheel including a first brake, a second wheel including a second brake, a third wheel including a third brake, and a fourth wheel including a fourth brake, the method comprising the steps of:
    receiving a first notification from a sensor indicating an unstable condition of the vehicle;

instructing a first system to rotate the first wheel and the second wheel at different rates in response to the first notification;
receiving a second notification that the first system is no longer able to rotate the first wheel and the second wheel at different rates; and instructing the second system to selectively apply at least one of the first brake and the second brake in response to the second notification.

* * * * *